United States Patent

[11] 3,601,232

| [72] | Inventor | Albert H. Elias<br>Cranham, Essex, England |
|---|---|---|
| [21] | Appl. No. | 777,558 |
| [22] | Filed | Nov. 21, 1968 |
| [45] | Patented | Aug. 24, 1971 |
| [73] | Assignee | Ford Motor Company<br>Dearborn, Mich. |
| [32] | Priority | Dec. 1, 1967 |
| [33] | | Great Britain |
| [31] | | 54,830/67 |

[54] MOTOR VEHICLE BRAKING SYSTEM
9 Claims, 3 Drawing Figs.

[52] U.S. Cl. .................................................. 188/170,
303/13
[51] Int. Cl. .................................................. F16d 65/24

[50] Field of Search .......................................... 188/106 P,
170; 303/13, 68; 91/156

[56] References Cited
UNITED STATES PATENTS

| 3,095,067 | 6/1963 | Murty et al. .................. | 188/170 |
| 2,423,204 | 7/1947 | Rockwell ....................... | 188/170 UX |
| 3,020,094 | 2/1962 | Murty et al. .................. | 188/170 X |

Primary Examiner—Duane A. Reger
Attorneys—John R. Faulkner and Clifford L. Sadler

ABSTRACT: A vehicle brake system having a brake control device that is spring actuated to apply the vehicle brakes. A pneumatic pressure-responsive piston and a hydraulic pressure-responsive piston are both constructed to release said brake against the force of the spring.

MOTOR VEHICLE BRAKING SYSTEM

BACKGROUND OF THE INVENTION

The invention relates to motor vehicle braking systems, and more particularly to emergency or parking brake systems for commercial vehicles such as heavy trucks.

Some trucks that are fitted with air-operated service brakes also are fitted with a control device operative to apply the brakes in an emergency or when parking. The device includes a piston mechanically connected to the brakes. The piston is biased by a spring to engage or apply the brakes. During normal operation the piston is held in a brakes-released position by air under pressure. The application or release of the brakes is controlled by the admission or release of air to the cylinder in which the piston is located. If there should be a failure of air pressure to the service brakes, then the air supply to the control device would be simultaneously cut off and the spring of the control device would thereupon apply the brakes.

Such spring-applied brakes are difficult to release in the absence of a supply of compressed air. Usually the release of the brakes requires disassembly of the control device.

BRIEF SUMMARY OF THE INVENTION

In view of the state of the art, it is the principal object of the present invention to provide an improved spring-applied emergency brake that has an easily operable means to release the brake.

In a vehicle according to the presently preferred embodiment of this invention, a wheel brake is connected by a mechanical linkage to a control device. The control device has a member actuated by fluid pressure supplied from a pressure source to hold the linkage in a position which, in turn, holds the brake in the released position. A spring acts on the linkage to bias the linkage toward the brake applied position. A control actuatable by the driver is operable to release the fluid pressure to permit the spring to apply the brake. A piston movable by the driver is operable to apply a liquid pressure to the member of the control device to move the member to release the brake.

BRIEF DESCRIPTION OF THE DRAWINGS

The invention is hereinafter particularly described with reference to the accompanying drawings in which.

DETAIL DESCRIPTION OF THE PREFERRED EMBODIMENT

Figure 1:
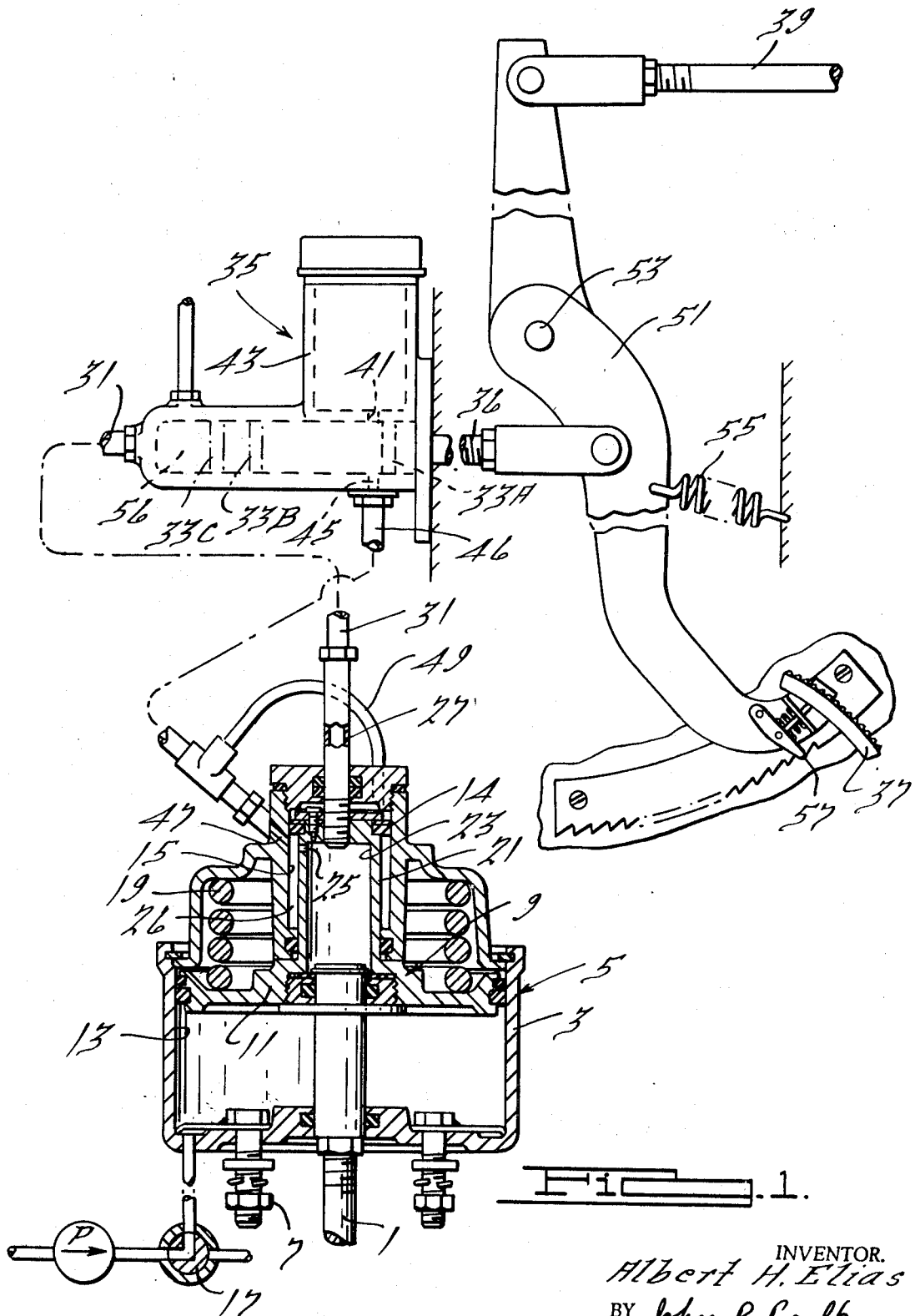
FIG. 1 is a diagrammatic view, partly in section, of an emergency or parking brake system in accordance with the presently preferred embodiment of this invention and which is particularly useful in a heavy truck.

The brakes of a truck are mechanically connected to the rod 1 in FIG. 1. When the rod 1 moves downwardly the brakes are applied mechanically. The rod 1 is moved downwardly either when it is desired to apply the parking brake or automatically in an emergency.

The rod 1 extends through a fluidtight gland into the casing 3 of control device 5. The casing 3 is secured by the bolts 7 to a structural member of the truck. The rod 1 is connected to a member 9. The member 9 has a first piston 11 slidable in a first cylinder 13 and a second piston 14 slidable in a second cylinder 15. The first cylinder 13 on the first side of the piston 11 is normally filled with compressed air supplied through a three-position valve 17 from a pressure source such as an engine-driven compressor. Air pressure in the cylinder 13 holds the rod 1 in the upper position shown in FIG. 1 to hold the brakes released.

A coil spring 19 acts on the reverse side of the first piston 11 and biases the rod 1 toward its brakes-applied position. When the valve 17 is moved into the position in which the cylinder 13 is connected to atmosphere, the spring 19 moves the member 9 downwardly so that the brakes are applied. When it is desired to release the brakes, the valve 17 is moved into the position in which air under pressure is admitted into the cylinder 15 to move the member 9 upwardly. Thus, the valve 17 is operated when it is desired to apply or release the brakes for parking or in an emergency.

It is assumed that a vehicle having the present invention that the service brake system, that is, the system for operating the brakes when the vehicle is travelling, would be operated by air under pressure. Thus, if there should be a failure in the compressed air system which would cause a failure of the service brakes, the spring 19 would apply the brakes automatically. With a failure in the supply of compressed air, the valve 17 cannot be operated to release the brakes.

In accordance with the present invention, means are provided to actuate the second piston 14 the control device 5 and thereby enable the rod 1 to be moved to release the brakes.

The second piston 14 is formed by a flange at the end of a cylindrical plunger 21 interconnecting the first and second pistons 11 and 14. The plunger 21 has a hollow chamber 23 which communicates with the second cylinder 15 through a restricted orifice 25. An annular chamber 26 is defined between the cylinder 15 and the plunger 21. A rigid tube 27 is fixed to the second piston 14 and extends slidably through end wall of the casing 3. Port 25 provides communication between chamber 23 and annular chamber 26. When liquid under pressure is supplied through the tube 27 into the chamber 23 and the member 9 is in the position shown in FIG. 2, the pressure acts on the lower side of the second piston 14 and urges the member 9 and the rod 1 upwardly.

The tube 27 is connected by a flexible conduit 31 to pressure side of a piston 33 in a conventional cylinder 35. The piston 33 is connected to a foot pedal 37 and to a handle operated by a rod 39. When the piston 33 is in the right-hand position illustrated in FIG. 1 and identified as 33A the pressure side of the piston 33 is connected through an orifice 41 to a reservoir 43 open to the atmosphere. When the piston 33 is moved to the left into the position marked 33B, the pressure side of the piston 33 is disconnected from the reservoir 43.

The fluid reservoir 43 is also connected through the orifice 41 and an orifice 45 with a conduit 46. A port 47 in the wall of the second cylinder 15 is connected to conduit 46. The port 47 is in communication with the annular chamber 26 when the second piston 14 is in the position shown in FIG. 1, which is the position in which the brakes are fully released. Thus in the brakes-released position, the pressure side of the master cylinder piston 33 and the annular chamber 26 are connected to the reservoir 43 which is at atmospheric pressure. The space between the reverse or upper side of the second piston 14 and the casing 3 is connected by a conduit 49 to the conduit 46 so that the pressure in this space is always the same as the pressure in the port 47.

The piston 33 of the master cylinder 35 is fixed to a rod 36. The rod 36 is pivotally connected to a lever 51 which is pivotally mounted at 53 and which is biased to the right in FIG. 1 by a tension spring 55. The lever 51 may be connected either to the handbrake rod 39 or to the pedal 37. The rod 39 has a conventional handbrake ratchet to hold it in a selected position against the spring 55a. The pedal 37 has a ratched device 57 which holds it in a selected position.

OPERATION

The rod 39 or pedal 37 when moved against the spring bias 55 releases the brakes after they have been applied in an emergency by the coil spring 19. The rod or pedal thus usually acts in the opposite sense to the normal handbrake or foot pedal, however, when moved into an extreme end position they act as normal foot brakes or handbrakes as will be described below.

When the vehicle is travelling and operating normally the braking system described above is not used. The normal air-operated service brake system is used. Under these conditions the first cylinder 13 is filled with air under pressure which holds the member 9 of the control device 5 in the FIG. 1 position in which the rod 1 is in the brake-disengaged position.

Figures 2, 3:
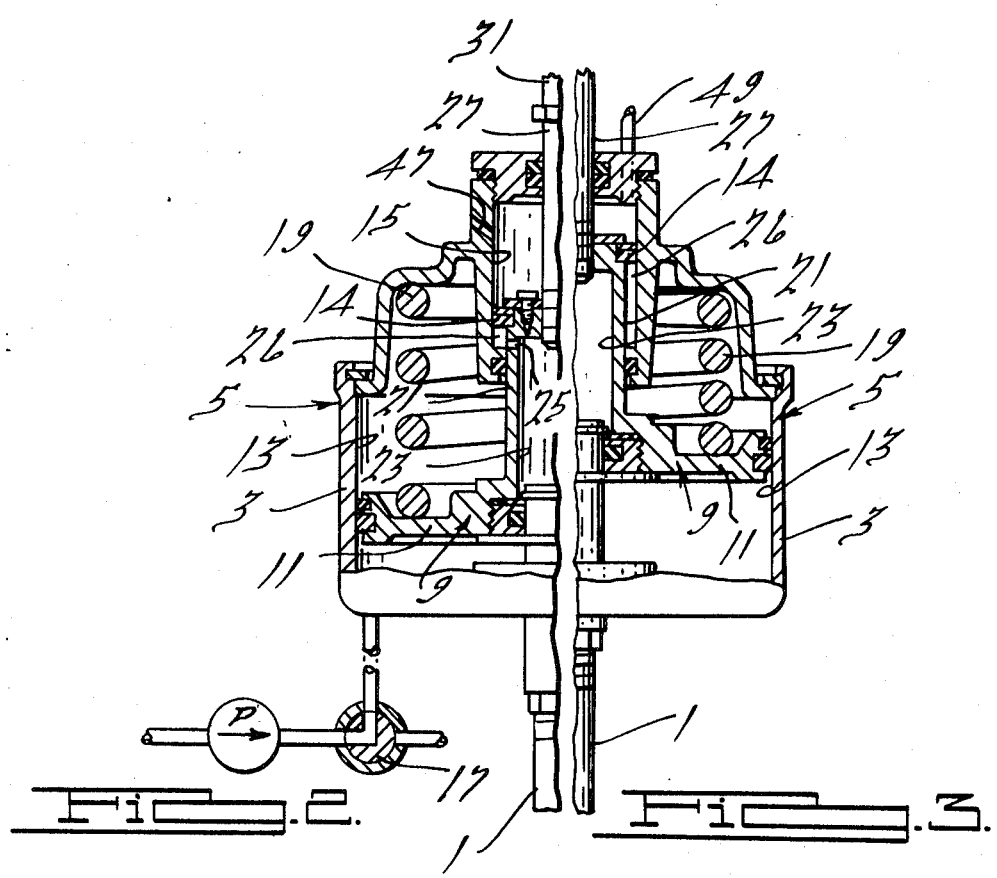
FIG. 2 is a sectional view of the control device of FIG. 1. The figure shows the arrangement of the components when the brakes are applied.
FIG. 3 is a sectional view of the control device of FIG. 1 and shows the arrangement of the components when the brakes are released.

When the vehicle is stopped and it is desired to apply a parking brake, the valve 17 is operated to release the air from the first cylinder 13. The coil spring 19 thereupon moves the member 9 downwardly to apply the brakes to which the rod 1 is connected (FIG. 2 position). When the parking brakes are to be released, air under pressure is admitted into the first cylinder 13. This acts on the first piston 11 and moves the member 9 (and rod 1) upwardly to release the brakes.

In an emergency, the air pressure to the service brakes may fail. If this should occur, the pressure in the first cylinder 13 would also escape and the coil spring 19 would move the member 9 downwardly. The speed of movement of the member 9 is controlled so that the brakes are not applied too harshly.

As the member 9 moves downwardly, the second piston 14 isolates the port 47 from the chambers 23 and 26. Liquid displaced from the chamber 26 by the second piston 14 is forced through the restricted orifice 25 into the chamber 23. The restriction of the orifice 25 to flow of liquid controls the rate of movement of the rod 1 and so controls the rate of application of the brakes. Liquid displaced from the chamber 23 flows through the tube 27, flexible conduit 31 and into the pressure chamber 56 of the master cylinder 35. From the latter chamber 56, liquid flows through the orifice 41 into the reservoir 43. The pressure in the reservoir 43 is atmospheric and so the only resistance to movement of the member 9 is that imposed by the orifice 25 as fluid escapes from chamber 26 to chamber 23.

When it is desired to release the parking or emergency brake when no air under pressure is available, the handbrake rod 39 or the pedal 37 is moved to slide the rod 36 to the left. This moves the piston 33 from the right-hand 33A position toward the 33B position. The initial movement of the piston 33 causes it to pass port 41 and disconnect the conduit 41 from the reservoir 43 and from the port 47 in the second cylinder 15. Further movement of the piston 33 forces liquid under pressure into the chamber 23 (FIG. 2) in the plunger 21, and through the orifice 25 into the annular chamber 26. The pressure of the liquid in the annular chamber 26 acts on the second piston 14 to move the rod 1 upwardly to release the brakes. The liquid on the reverse side of the second piston 14 is exhausted through the port 47, conduit 46, orifice 45 and orifice 41 into the reservoir 43. The brakes are released well before the second piston 14 reaches the port 47. A conventional handbrake-type ratchet on the rod 39 or the ratchet device 57 on the foot pedal holds the piston 33 of the master cylinder in the position to lock hydraulic pressure in the system. The brakes may be applied by releasing the ratchet.

After the emergency brake has been released by means of the pedal 37 or handbrake rod 39, the driver may apply the brakes by releasing the ratchet. The instinctive act is, however, to pull further on the handle 39 or depress further the pedal 37 to move the piston 33 of the master cylinder into the 33C position. The further increase in pressure in the master cylinder moves the second piston 14 upwardly until the port 47 again communicates with the second cylinder 15 (see FIG. 1). The pressure in the second cylinder 15 is thereupon released through the conduit 46, orifice 45 and orifice 41 into the reservoir 43. The brakes are consequently applied by the spring 19.

CONCLUSION

Therefore, the present invention provides, in one of its embodiments, a brake control device having a spring constructed to apply the vehicle brakes. A pneumatic pressure-responsive piston and a hydraulic pressure-responsive piston are both constructed to release said brake against the force of the spring.

I claim:

1. A brake control device having a housing, a control assembly slidably mounted within said housing, said assembly being connected to a vehicle brake and constructed to move between a brake-applied position and a brake-released position, spring means urging said assembly toward said brake-applied position, said assembly having a first piston portion engaging said housing and defining in part a first fluid pressure chamber, said chamber being constructed to be connected to a first fluid pressure source, said first piston portion being responsive to fluid pressure in said first chamber to urge said assembly to a brake-released position, said assembly having a second piston portion engaging a portion of said housing, said second piston portion defining in part a second fluid pressure chamber, means constructed to connect said second pressure chamber to a second fluid pressure source, said second piston portion being responsive to fluid pressure in said second pressure chamber to also urge said assembly to a brake-released position, automatic-venting means responsive to the position of said control assembly and construction to automatically vent said second pressure chamber to atmospheric pressure when said assembly is displaced to an extreme brake-released position.

2. A brake control device having a housing, a control assembly slidably mounted within said housing, said assembly being connected to a vehicle brake and constructed to move between a brake-applied position and a brake-released position, spring means urging said assembly toward said brake-applied position, said assembly having a first piston portion engaging said housing and defining in part a first fluid pressure chamber, said chamber being constructed to be connected to a first fluid pressure source, said first piston portion being responsive to fluid pressure in said first chamber to urge said assembly to a brake-released position, said assembly having a second piston portion engaging a portion of said housing, said second piston portion defining in part a second fluid pressure chamber, means constructed to connect said second pressure chamber to a second fluid pressure source, said second piston portion being responsive to fluid pressure in said second pressure chamber to also urge said assembly to a brake-released position, automatic-venting means responsive to the position of said control assembly and constructed to automatically vent said second pressure chamber to atmospheric pressure when said assembly is displaced to an extreme brake-released position, a pneumatic pressure source connected to said first pressure chamber, a hydraulic pressure source connected to said second pressure chamber.

3. A spring-actuated device for applying the brakes of a motor vehicle including a control device constructed to be connected to a wheel brake for applying and releasing said brake, spring means constructed to urge said control device into a brake-applied position, fluid pressure-responsive means constructed to be connected to the fluid-operated brake system of a motor vehicle and further constructed to automatically hold said control device in a brake-released position against the force of said spring means when said fluid brake system is operative and pressurized, said fluid pressure-responsive means being constructed to automatically allow the movement of said control device from its brake-released position to its brake-applied position upon the loss of pressure in said brake system, manually actuatable fluid pressure means constructed to move said control device to a brake-released position against the force of said spring means, said manual means including a slave cylinder connected to said device, a master cylinder hydraulically connected to said slave cylinder, and a manually operated element connected to said master cylinder and constructed to actuate said master cylinder, said manually operated element being displaceable between a retracted position, an intermediate position and an extreme position, said manual means being constructed to be inoperative when said manually operated element is in its retracted position, said manual means being constructed to pressurize said master and slave cylinders and to move said control device to its brake-released position when said manually operated element is displaced from its retracted position to its intermediate position and said manual means be constructed to depressurize said slave cylinder to permit said spring means to move said control device to its brake-applied position upon displacement of said manual element from its intermediate position to its extreme position.

4. A spring-actuated device for applying motor vehicle brakes including a housing, a control assembly slidably mounted within said housing, said assembly being connected to a vehicle brake and constructed to move between a brake-applied position and a brake-released position, spring means urging said assembly toward said brake-applied position, said assembly having a first piston portion engaging said housing and defining in part a first fluid pressure chamber, said chamber being constructed to be connected to a first fluid pressure source of a motor vehicle brake system, said first piston portion being pressure responsive to fluid pressure in said first chamber to urge said assembly to a brake-released position against the force of said spring means, said assembly having a second piston portion engaging a portion of said housing, said second piston portion defining in part a second fluid pressure chamber, means constructed to connect said second pressure chamber to a second fluid pressure source, said second piston portion being responsive to fluid pressure in said second pressure chamber to urge said assembly to a brake released position, said device being operative to move said assembly from said brake-released position to said brake-applied position to apply the brakes of said motor vehicle by the force of said spring means when fluid pressure is released from said first chamber, said device being operative to release said vehicle brakes by pressurizing said second chamber to move said control assembly to its brake-released position against the force of said spring means.

5. A spring-actuated device for applying motor vehicle brakes according to claim 4 and including:
damping means independent of said first fluid pressure chamber constructed to retard the movement of said control assembly from its brake-released position to its brake-applied position when fluid pressure in said first chamber is suddenly and completely relieved.

6. A spring-actuated device for applying motor vehicle brakes according to claim 5 and including:
automatic-venting means responsive to the position of said control assembly and constructed to automatically vent said second pressure chamber to atmospheric pressure when said assembly is displaced to an extreme brake-released position.

7. A spring-actuated device for applying motor vehicle brakes including a housing, a control assembly slidably mounted within said housing, said assembly being connected to a vehicle brake and constructed to move between a brake-applied position and a brake-released position, spring means urging said assembly toward said brake-applied position, said assembly having a first portion engaging said housing and defining in part a first pressure chamber, said chamber being constructed to be connected to a pneumatic pressure source of a motor vehicle's pneumatic brake system, said first piston portion being pressure responsive to pneumatic pressure in said first chamber to urge said assembly to a brake-released position, said assembly having a second piston portion engaging a portion of said housing, said second piston portion defining in part a second pressure chamber, means constructed to connect said second pressure chamber to a hydraulic pressure source, said second piston portion being responsive to hydraulic pressure in said second pressure chamber to urge said assembly to a brake-released position, said device being operative to move said control assembly from said brake-released position to said brake-applied position to apply the brakes of a motor vehicle by the force of said spring means when pneumatic pressure is released from said first chamber, said device being operative to release said vehicle brake by hydraulically pressurizing said second chamber to move said control assembly to its brake-released position against the force of said spring means, damping means constructed to retard the movement of said control assembly from its brake-released position to its brake-applied position when pneumatic pressure in said first chamber is suddenly relieved.

8. A brake control device according to claim 7 and including:
automatic-venting means responsive to the position of said control assembly and constructed to vent said second pressure chamber to atmospheric pressure when said assembly is displaced to an extreme brake-released position.

9. A spring-actuated device for applying the brakes of a motor vehicle including a control device constructed to be connected to a wheel brake for applying and releasing said brake, spring means constructed to urge said control device into a brake-applied position, first fluid pressure-responsive means constructed to be connected to the fluid-operated brake system of a motor vehicle and further constructed to automatically hold said control device in a brake-released position against the force of said spring means when said fluid brake system is operative and pressurized, said fluid pressure responsive means being constructed to automatically allow the movement of said control device from its brake-released position to its brake-applied position upon the loss of pressure in said brake system, and manually actuatable second fluid pressure-responsive means constructed to move said control device to a brake-released position against the force of said spring means, said second pressure-responsive means also including damping means constructed to retard the movement of said control device from said brake-released position to said brake-applied position when there is a loss of pressure in said brake system.